(12) United States Patent
Teng

(10) Patent No.: US 7,609,228 B1
(45) Date of Patent: Oct. 27, 2009

(54) AUTOMATIC KEYSTONE CORRECTION SYSTEM AND METHOD

(75) Inventor: Tianbing Brian Teng, Portland, OR (US)

(73) Assignee: Pixelworks, Inc., Tualatin, OR (US)

( * ) Notice: Subject to any disclaimer, the term of this patent is extended or adjusted under 35 U.S.C. 154(b) by 610 days.

(21) Appl. No.: 10/932,597

(22) Filed: Sep. 1, 2004

Related U.S. Application Data

(63) Continuation-in-part of application No. 10/832,488, filed on Apr. 26, 2004, which is a continuation-in-part of application No. 10/753,833, filed on Jan. 5, 2004, now abandoned.

(60) Provisional application No. 60/443,422, filed on Jan. 28, 2003.

(51) Int. Cl.
*G09G 5/00* (2006.01)

(52) U.S. Cl. ....................................................... 345/1.3

(58) Field of Classification Search .................. None
See application file for complete search history.

(56) References Cited

U.S. PATENT DOCUMENTS

| | | | |
|---|---|---|---|
| 5,301,036 A | 4/1994 | Barrett et al. | |
| 5,355,188 A | 10/1994 | Biles et al. | |
| 5,720,539 A | 2/1998 | Woo | |
| 6,056,408 A | 5/2000 | Kobayashi | |
| 6,111,573 A | 8/2000 | McComb et al. | |
| 6,169,535 B1 | 1/2001 | Lee | |
| 6,298,735 B1 | 10/2001 | Dias | |
| 6,305,805 B1 | 10/2001 | Liebenow | |
| 6,310,662 B1 | 10/2001 | Sunakawa et al. | |
| 6,339,434 B1 | 1/2002 | West et al. | |
| 6,367,933 B1 | 4/2002 | Chen et al. | |
| 6,520,547 B2 | 2/2003 | Robinson | |
| 6,520,646 B2 | 2/2003 | Rodriguez et al. | |
| 6,520,647 B2 | 2/2003 | Rodriquez et al. | |
| 6,592,228 B1 | 7/2003 | Kawashima et al. | |
| 6,611,260 B1 | 8/2003 | Greenberg et al. | |
| 6,620,647 B2 | 9/2003 | Kroner | |
| 6,639,614 B1 | 10/2003 | Kosslyn et al. | |
| 6,686,973 B2 | 2/2004 | Su | |
| 6,793,347 B2 | 9/2004 | Morishita | |
| 6,836,298 B2 | 12/2004 | Song et al. | |
| 6,843,569 B2 | 1/2005 | Hirao et al. | |
| 6,846,081 B2 | 1/2005 | Mochizuki et al. | |
| 6,867,753 B2 | 3/2005 | Chinthammit et al. | |
| 6,877,863 B2 | 4/2005 | Wood et al. | |
| 6,962,417 B1 | 11/2005 | Teng et al. | |
| 6,963,348 B2 * | 11/2005 | Diamond et al. | ............. 345/647 |
| 6,974,217 B2 | 12/2005 | Kimura et al. | |
| 2001/0000300 A1 | 4/2001 | Haile-mariam | |
| 2002/0008697 A1 | 1/2002 | Deering | |
| 2002/0021418 A1 * | 2/2002 | Raskar | ......................... 353/69 |
| 2002/0060754 A1 | 5/2002 | Takeuchi | |
| 2002/0063726 A1 | 5/2002 | Jouppi | |

(Continued)

*Primary Examiner*—Sumati Lefkowitz
*Assistant Examiner*—Tammy Pham
(74) *Attorney, Agent, or Firm*—Marger Johnson & McCollom, P.C.

(57) ABSTRACT

The invention relates to an automatic keystone correction system and method. The system includes a projection means to project an image on a projection surface and a means for selecting a maximally distorted corner on the image. And the system includes means for moving the maximally distorted corner from a first to a second position and means for distorting image data responsive to the moving.

30 Claims, 12 Drawing Sheets

U.S. PATENT DOCUMENTS

| | | |
|---|---|---|
| 2002/0089651 A1 | 7/2002 | Ejiri et al. |
| 2002/0109668 A1 | 8/2002 | Rosenberg et al. |
| 2003/0234797 A1 | 12/2003 | Williams et al. |
| 2004/0036844 A1 | 2/2004 | Wood et al. |
| 2004/0095317 A1 | 5/2004 | Zhang et al. |
| 2005/0168705 A1 | 8/2005 | Li et al. |

* cited by examiner

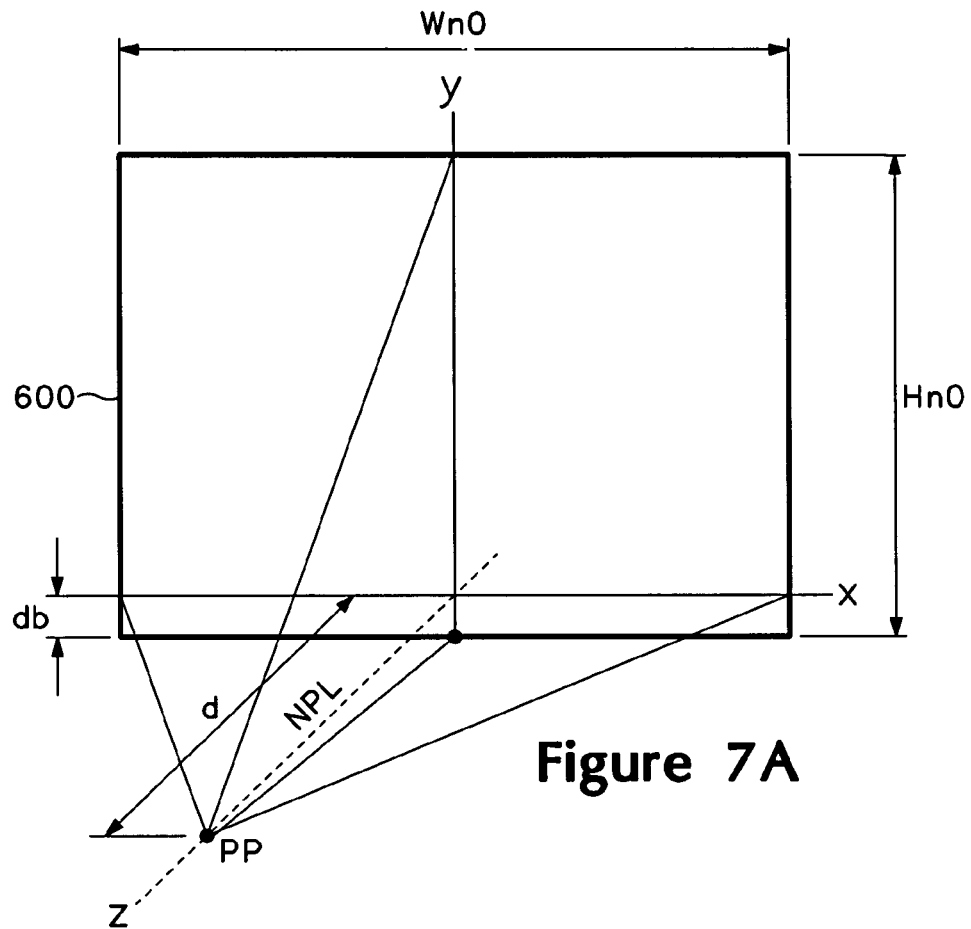
Figure 7A
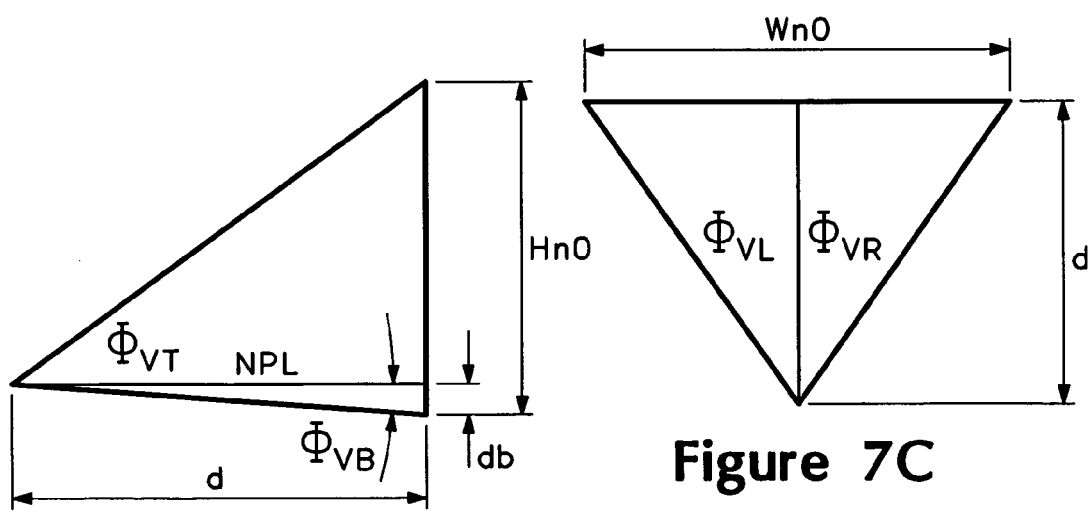
Figure 7B
Figure 7C

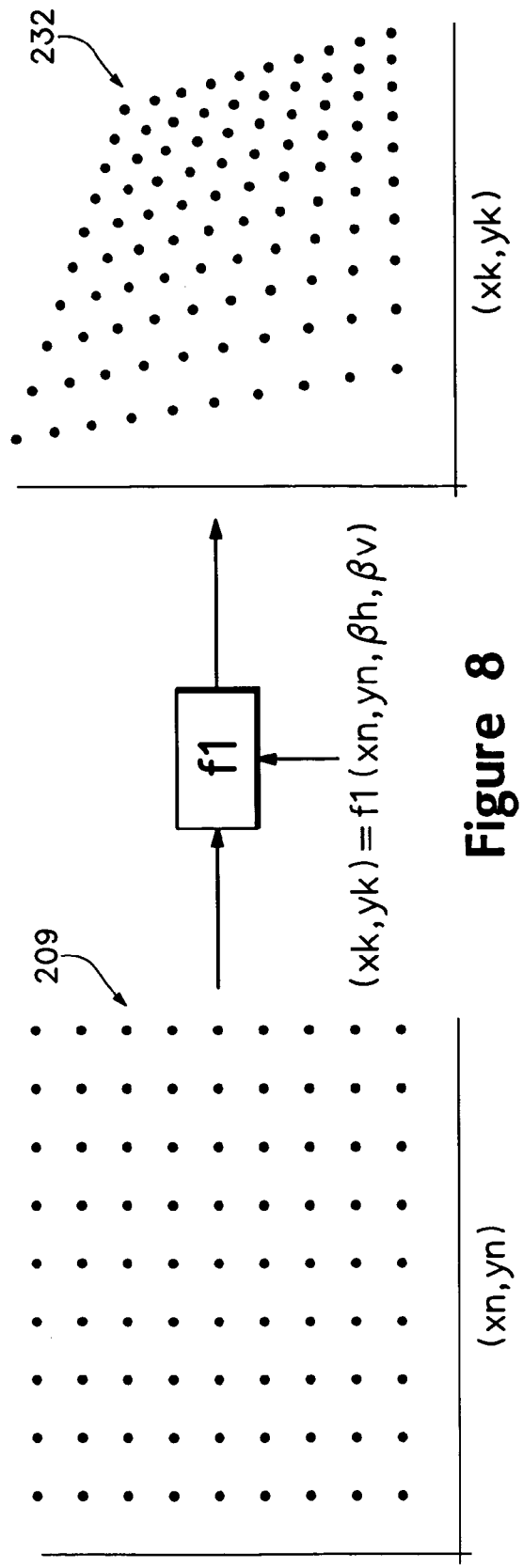
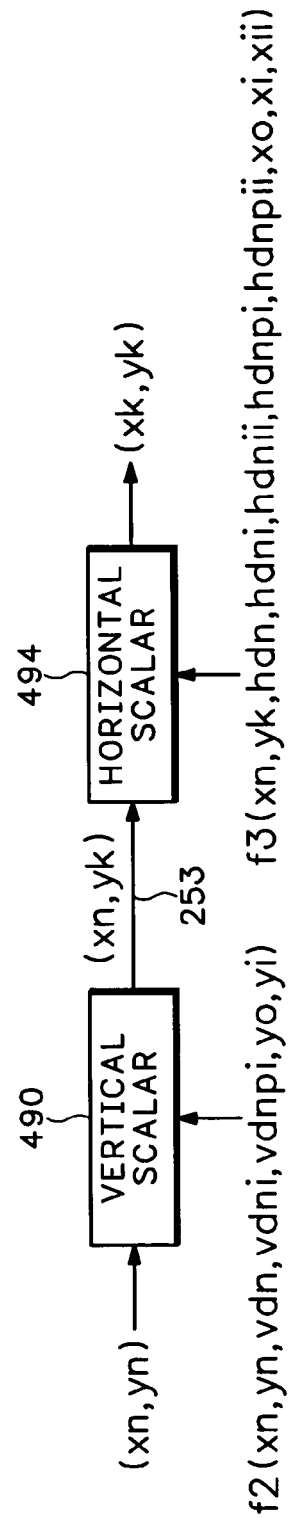
Figure 8
Figure 9

$$\operatorname{tg} \beta h = \sin \beta v \operatorname{tg} \beta r$$

AUTOMATIC KEYSTONE CORRECTION SYSTEM AND METHOD

This application is a continuation in-part of U.S. patent application Ser. No. 10/832,488, filed Apr. 26, 2004, titled Automatic Keystone Correction System and Method, which is a continuation in-part of U.S. patent application Ser. No. 10/753,833, filed Jan. 5, 2004 now abandoned, titled Automatic Keystone Correction System and Method, which claims priority to U.S. provisional patent application Ser. No. 60/443,422 filed Jan. 28, 2003, titled Method and Apparatus for Keystone Correction. We incorporate the '488, '833 and '422 applications in their entirety.

FIELD OF THE INVENTION

This invention relates to a system and method capable of projecting images and, more particularly, to a system and method capable of projecting images with automatically corrected keystone distortion.

BACKGROUND OF THE INVENTION

Projection systems are widely used in training, sales, and business environments. Referring to FIG. 1, a projection system 100 includes a projector 102 positioned on a horizontal surface 104. The surface 104 is typically a desk or tabletop. An elevator 120 protrudes from the bottom sides of the projector 102 creating an angle 110 between the surface 104 and the projector 102. Only one elevator 120 is visible in FIG. 1 although a person of reasonable skill in the art should understand that a plurality of elevators 120 might be employed in the system 100. Likewise, a person of reasonable skill in the art should recognize that the projector 102 refers to any system capable of projecting any of a variety of still or moving images, e.g., projection televisions, multimedia projectors, computer displays, and the like.

The angle 110 varies depending on the position of the elevator 120. The elevator 120 tilts the projector 102's position relative to the surface 104 such that projected image 122 moves up or down on a projection surface 114, increasing or decreasing the angle 110. The projection surface 114 might be a wall, screen, or any other surface capable of displaying a projected image 122.

The projector 102 manipulates (undistorted) image data 108 it receives from a personal computer 106. A person of reasonable skill in the art should recognize that the projector 102 might receive different types of image signals, e.g., digital or analog signals, from any of a variety of input devices including the personal computer 106. The image data 108 represents still, partial, or full motion images of the type rendered by any of a variety of input devices including the personal computer 106.

The projector 102 casts the image data 108 onto the projection surface 114. The resulting projected image 122 centers about a projection axis 116. An angle 112 exists between the projection axis 116 and the projection surface 114. The angle 112 changes responsive to the angle 110 and the horizontal position of the projector 102 on the desk or tabletop 104.

The projected image 122 is substantially undistorted—e.g., substantially rectangular in appearance—if the projection axis 116 is perpendicular to the projection surface 114. That is, the image 122 is undistorted if the angle 112 is 90 degrees. The projected image 122, however, distorts if the projection axis 116 is not perpendicular to the projection surface 114. This distortion is termed keystone distortion (or keystoning) because the image will appear wider at the top than at the bottom as shown in the image 122.

There are well known ways of correcting keystone distortion. The elevator 120 might, for example, be coupled to optics encased in the projector 102 that compensate for keystone distortion. The optics, however, are costly and prone to dust collecting that results in obscured projected images.

Signal processing circuits are often used, for example, to oppositely distort the image data 108 to thereby compensate for keystone distortion prior to projecting the image 122. But these circuits require floating point processes that exceed real time system capability.

The projector 102 might include gauges 124 used to manually adjust the projected image 122 to eliminate or minimize keystone distortion. The manual adjustments tend to move the projected image 122 out of the projection surface 114. And the manual adjustments, unfortunately, are time consuming, cumbersome, and generally an unwelcome set up complication.

Accordingly, a need remains for an automatic keystone correction system and method.

BRIEF DESCRIPTION OF THE DRAWINGS

The foregoing and other objects, features, and advantages of the invention(s) will become more readily apparent from the detailed description of invention embodiments that references the following drawings.

FIGS. 7A-C are diagrams of a coordinate system used to describe keystone distortion.
FIGS. 8 and 9 are graphical representations of the operation of the keystone controller shown in FIGS. 5 and 6.

DESCRIPTION OF THE INVENTION

Figure 2:
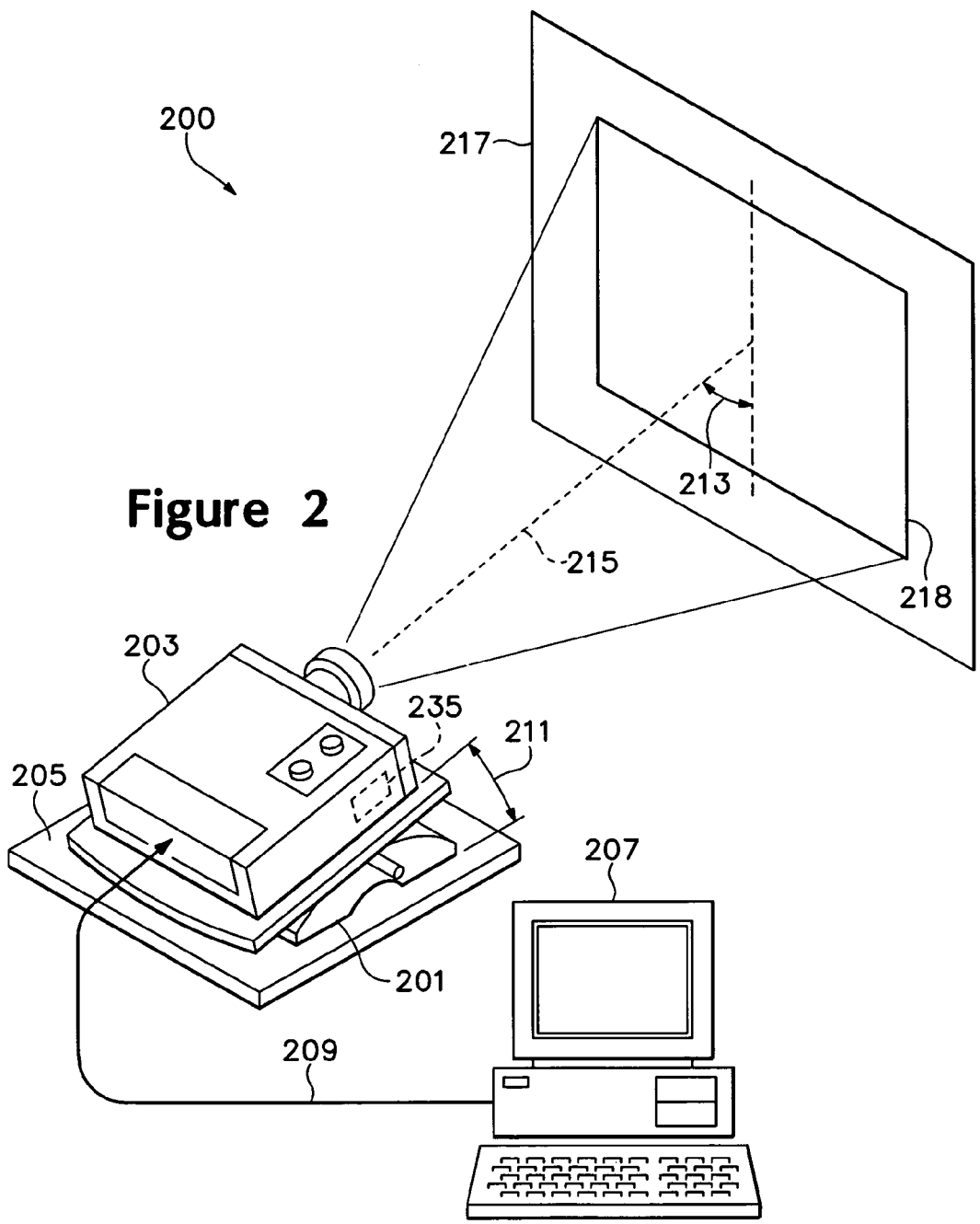
FIG. 2 is a diagram of an inventive projection system.

FIG. 2 is a diagram of an inventive projection system 200. Referring to FIG. 2, the system 200 includes a projector 203 coupled to a support 201. The projector 203 might tilt vertically and rotate horizontally on the support 201 moving the projected image 218 on a projection surface 217. The projector 203 with its support 201 is typically positioned on a horizontal surface 205, e.g., a desk or tabletop.

The support 201 might be fixedly or removably coupled to the projector 203. The support 201 is shown in more detail in FIGS. 3A-D. Referring to FIGS. 3A-D, the support 201 includes a base 227 and a platform 219. The base 227 includes a curved wall 223 that, in turn, includes at least one channel 225. It should be apparent to one of skill in the art that the base 227 might include one or a plurality of channels 225. The base 227 is movably coupled to the platform 219 such that the platform 219 rides up and down the curved wall 223 on the at least one channel 225. And the base 227 is movably coupled to the platform 219 to allow it to horizontally rotate about a center axis 229. The base 227 is coupled to the platform 219 using a variety of well-known coupling means.

Figure 3A:
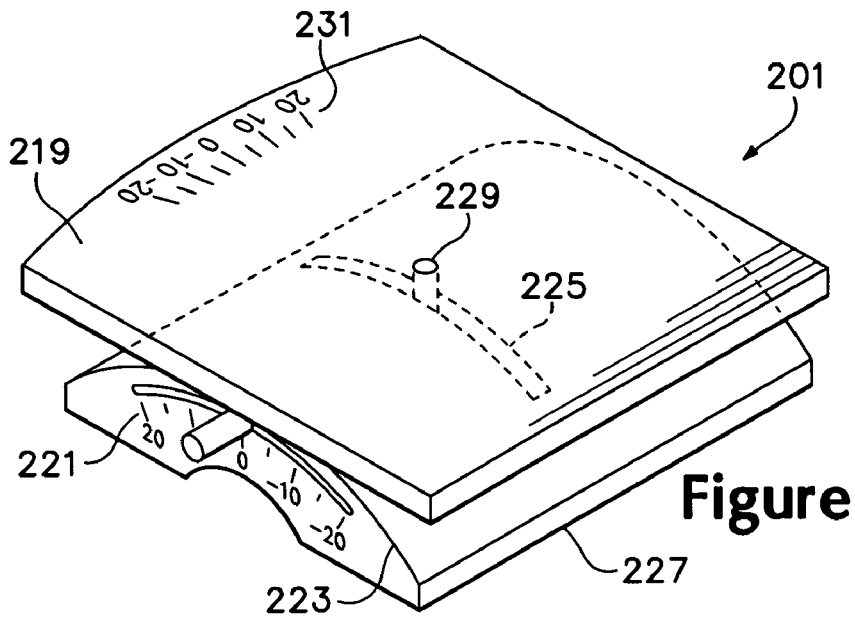
FIGS. 3A-D are diagrams of an inventive support.
Figure 3B:
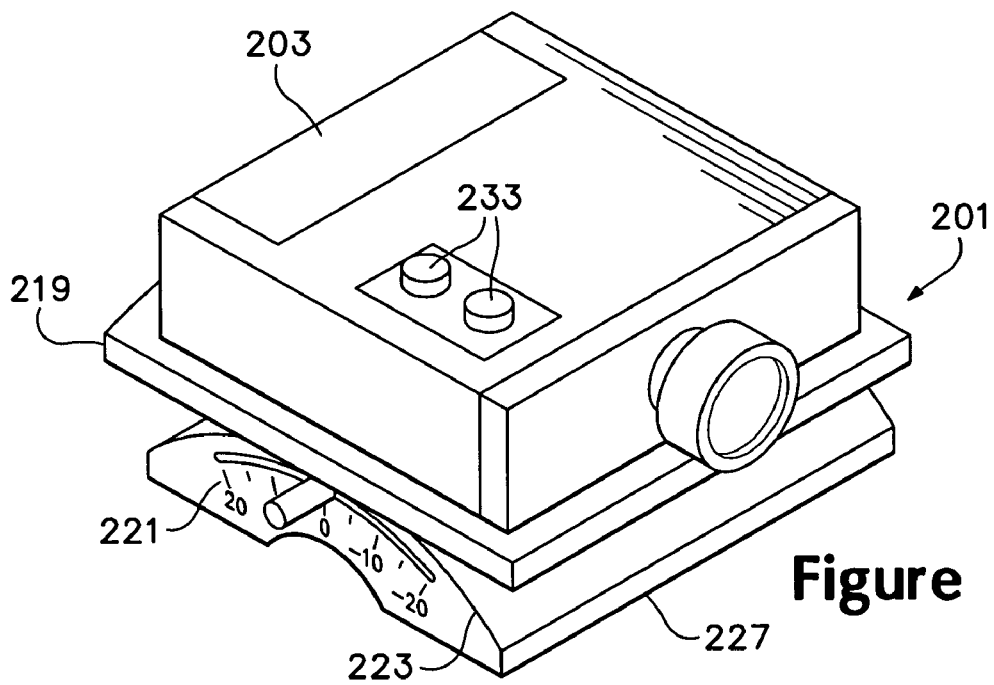
Figure 3C:
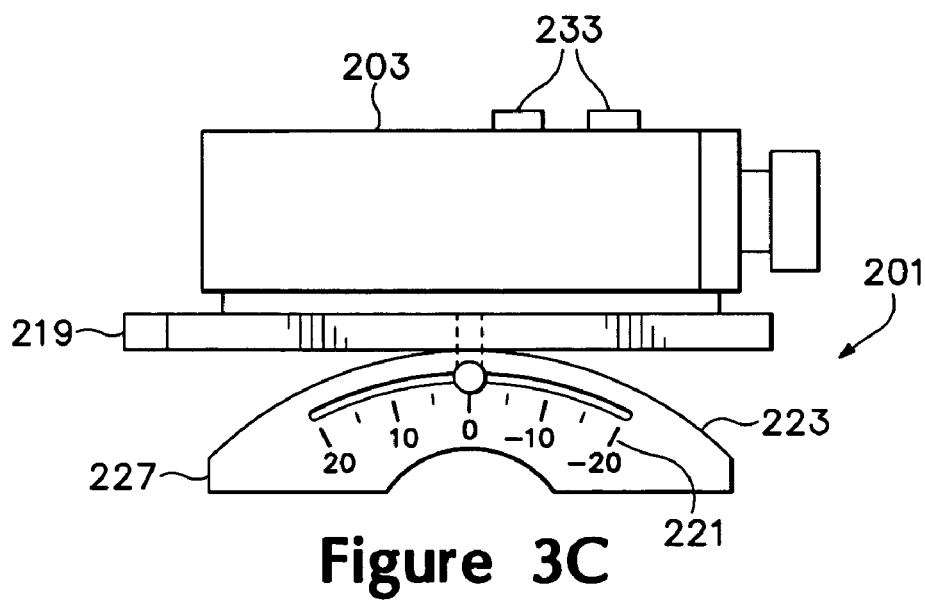
Figure 3D:
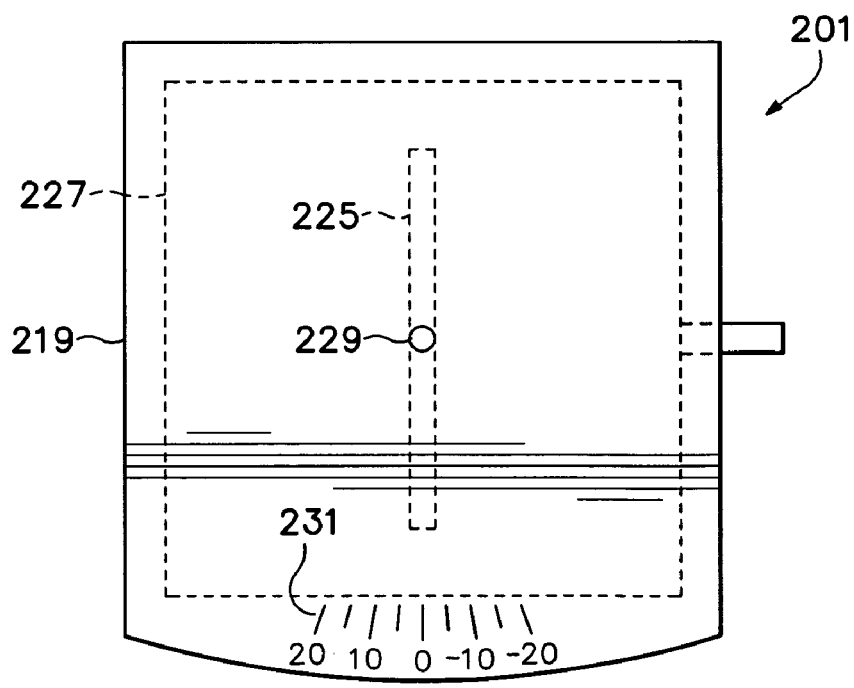

The projector 203 sits on top of the platform 219 as best shown in FIGS. 3B and 3C. The projector 203 tilts or moves vertically along the base 227's curved wall 223. That is, the projector 203 moves up and down the curved wall 223 on the channel 225. In one embodiment, the curved wall 223 might include a vertical gauge 221 (FIGS. 3B and 3C) allowing the user to more accurately manually adjust and identify the vertical orientation of the projector 203. In another embodiment, the platform 219 might include a horizontal gauge 231 to more accurately manually adjust and identify the horizontal rotation of the projector 203 (FIG. 3D). The vertical and horizontal gauges 221 and 231 might be marked with degrees of rotation or general position as shown in FIGS. 3B-D. The vertical and horizontal gauges 221 and 231 might be positioned in any of a variety of appropriate locations within the support 201.

Figure 5:
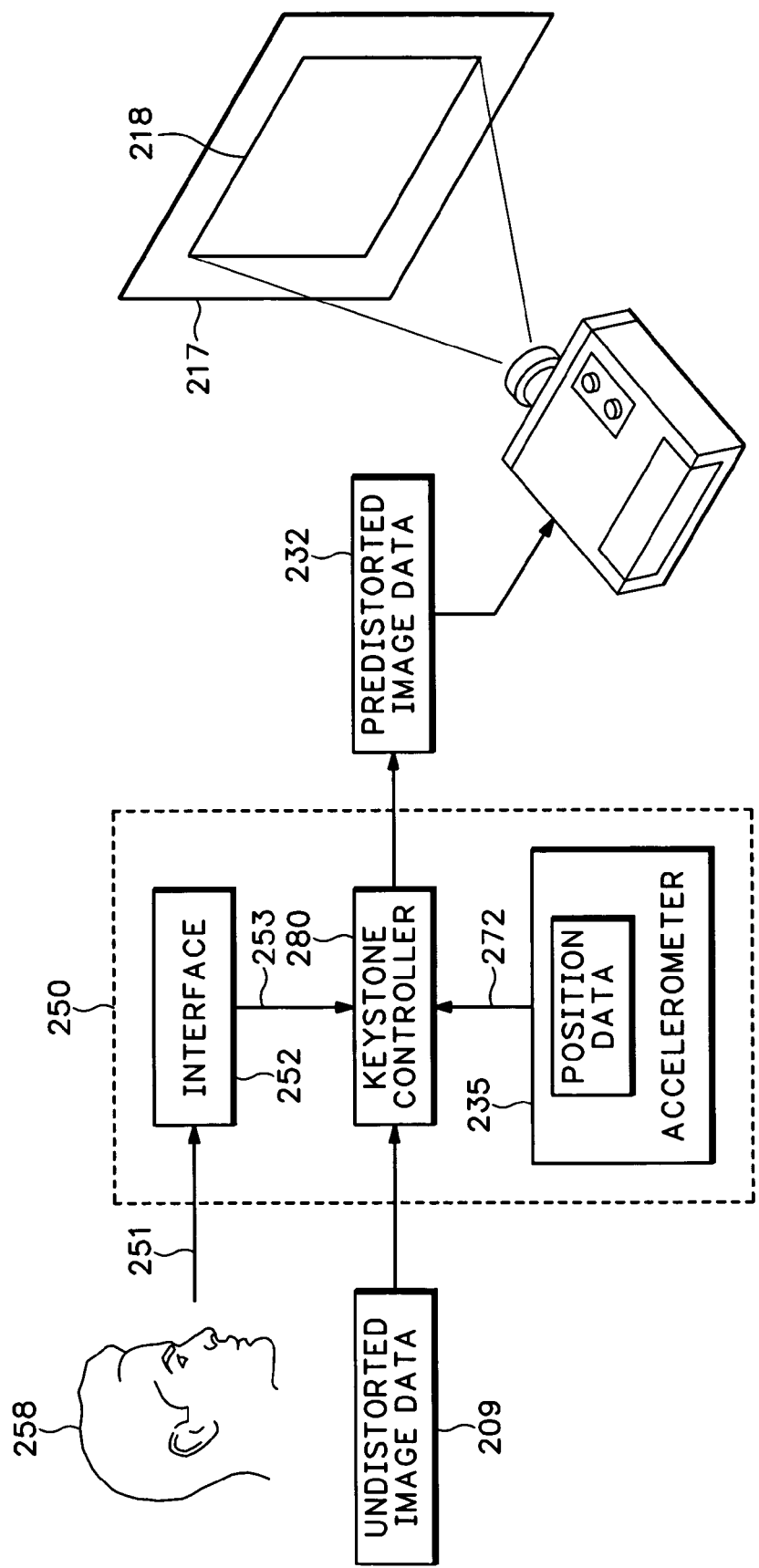
FIG. 5 is a block diagram of an inventive panel controller.

In an embodiment, the gauges 221 and 231 allow for more accurate semiautomatic keystone correction distortion since the user does not need to guess at vertical and horizontal orientation of the projector 203. To effectuate keystone correction, the user inputs the horizontal and vertical positions of the projector 203 as reflected in the gauges 221 and 231, respectively, to the projector's hardware and software using, e.g., a graphical user interface 252 (FIG. 5). The projector 203 implements keystone correction by (pre) distorting the image data 209 such that the image cast on the surface 217 does not exhibit keystoning. The projector 203 (pre) distorts the image data 209 by horizontally and vertically scaling it responsive to the user's identification of the projector 203's horizontal and vertical position.

In an embodiment, the support 201 might include motors, e.g., step motors, coupled to the base 227 and the platform 219 to automatically move the projector 203 vertically and horizontally. The step motors might be actuated using a variety of well-known actuation devices, e.g., buttons 233. The projector's electronics can read the motor steps (in the case of using step motors) to discern the rotation angle and to, ultimately, more accurately semi automatically correct for keystone distortion.

Figure 1:
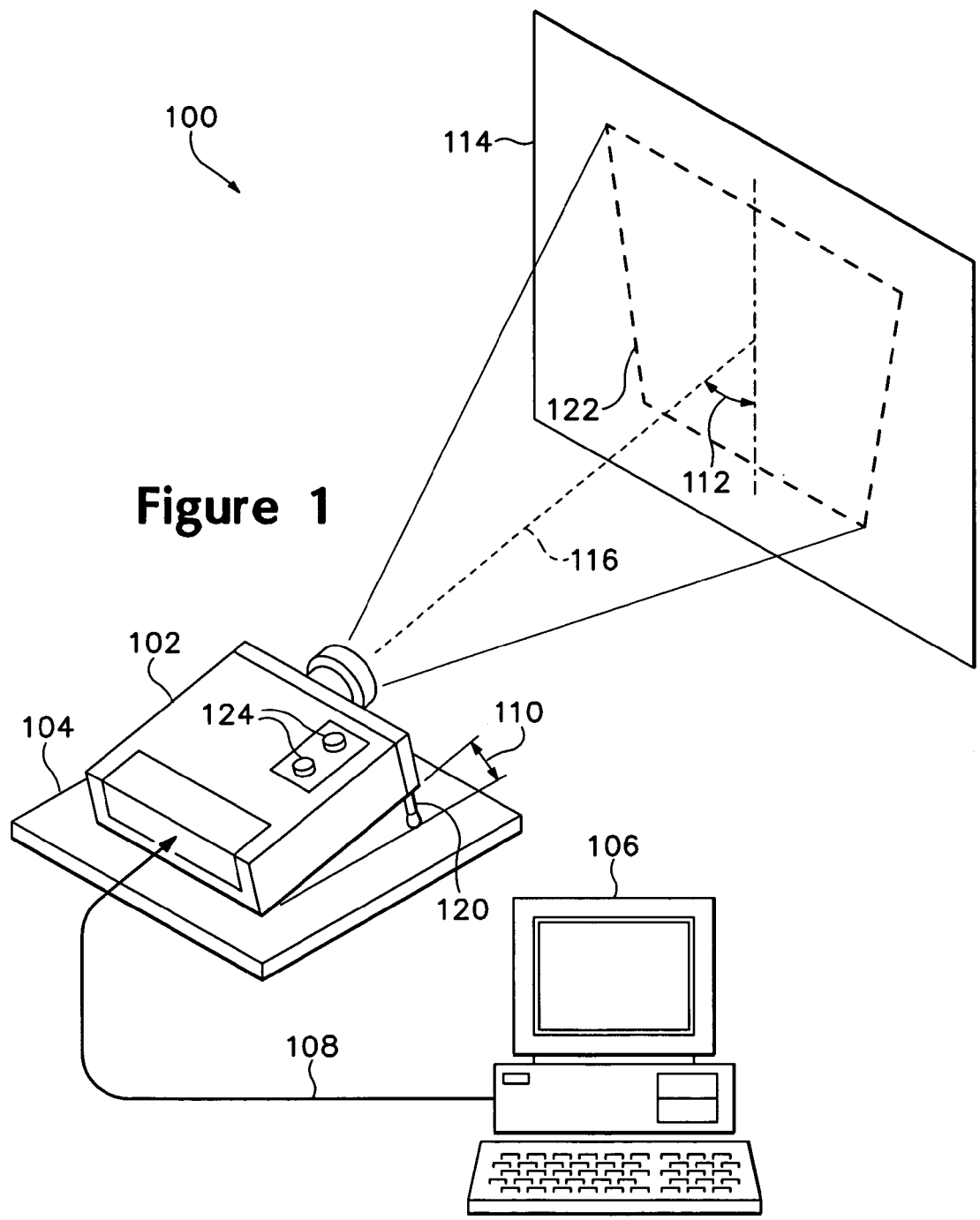
FIG. 1 is a diagram of a projection system.

It should be apparent to one of skill in the art that other supports 201 come within the scope of the present invention, including the elevators 120 shown in FIG. 1.

Figure 11:
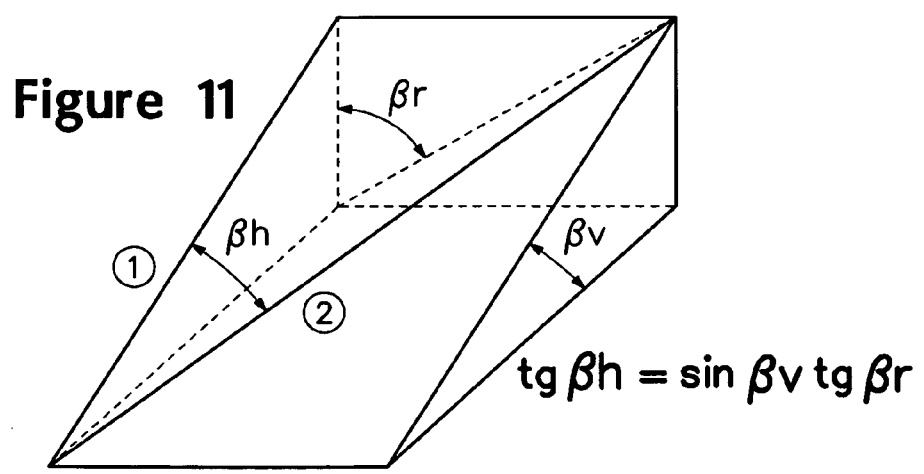
FIG. 11 is a geometric simplification of the relationship between projection angles.

Returning to FIG. 2, the angle 211 varies depending on the vertical tilt βv of the projector 203 as better shown in FIG. 11. The support 201 tilts the projector 203's position relative to the surface 205 such that projected image 218 moves up or down on the projection surface 217, increasing or decreasing the angle 211. The projection surface 217 might be a wall, screen, or any other surface capable of displaying a projected image 218. And the projected image 218 moves side to side on the projection surface 217 responsive to the projector 203's horizontal rotation on the support 201.

The projector 203 manipulates (undistorted) image data 209 it receives from a variety input devices, e.g., personal computer 207. A person of reasonable skill in the art should recognize that the projector 203 might receive different types of image signals, e.g., digital or analog signals, from any of a variety of input devices including the personal computer 207. The image data 209 represent still, partial, or full motion images of the type rendered by any of a variety of input devices including the personal computer 207.

The projector 203 casts the image data 209 onto the projection surface 217 as the projected image 218. The projected image 218 centers about a projection axis 215. An angle 213 exists between the projection axis 215 and the projection surface 217. The angle 213 changes responsive to changes in the vertical tilt βv and rotation βr of the projector 203 as indicated by angle 211.

The projector 203 is coupled to an accelerometer 235. The accelerometer 235 detects the projector 203's position in at least two directions. In an embodiment, the accelerometer 235 measures the projector's 203 vertical tilt βv and rotation βr. The accelerometer 235 provides the vertical tilt βv and rotation βr to a keystone controller 280 (FIG. 5) as we explain in more detail below.

A person of reasonable skill in the art should recognize that the accelerometer 235 is but one example of a two-dimensional position detecting means. Other such two-dimensional position detecting means come within the scope of the present invention. These might include arranging two one-dimensional accelerometers at 90 degrees from one another to simulate a single bidirectional accelerometer. Other examples include ultrasound, laser, and other like position detection means.

The accelerometer 235 might be coupled directly to the projector 203. Or it might be coupled to the support 201 in turn coupled to the projector 203. A person of reasonable skill in the art should recognize that the accelerometer 235 might be coupled to the projector 203 in a variety of ways and in a variety of locations that are well suited for it to determine the projector's 203 vertical tilt βv and rotation βr.

The accelerometer 235 is a type of inertial sensor that might measure tilt, shock, vibration, and/or inertial acceleration. The accelerometer 235 might be any of the accelerometers manufactured by e.g., Memsic, Inc., including its MXD, MXA, and MXR lines. The design of accelerometer 235 is well known to those of reasonable skill in the art and will not be discussed any further.

Figure 4:
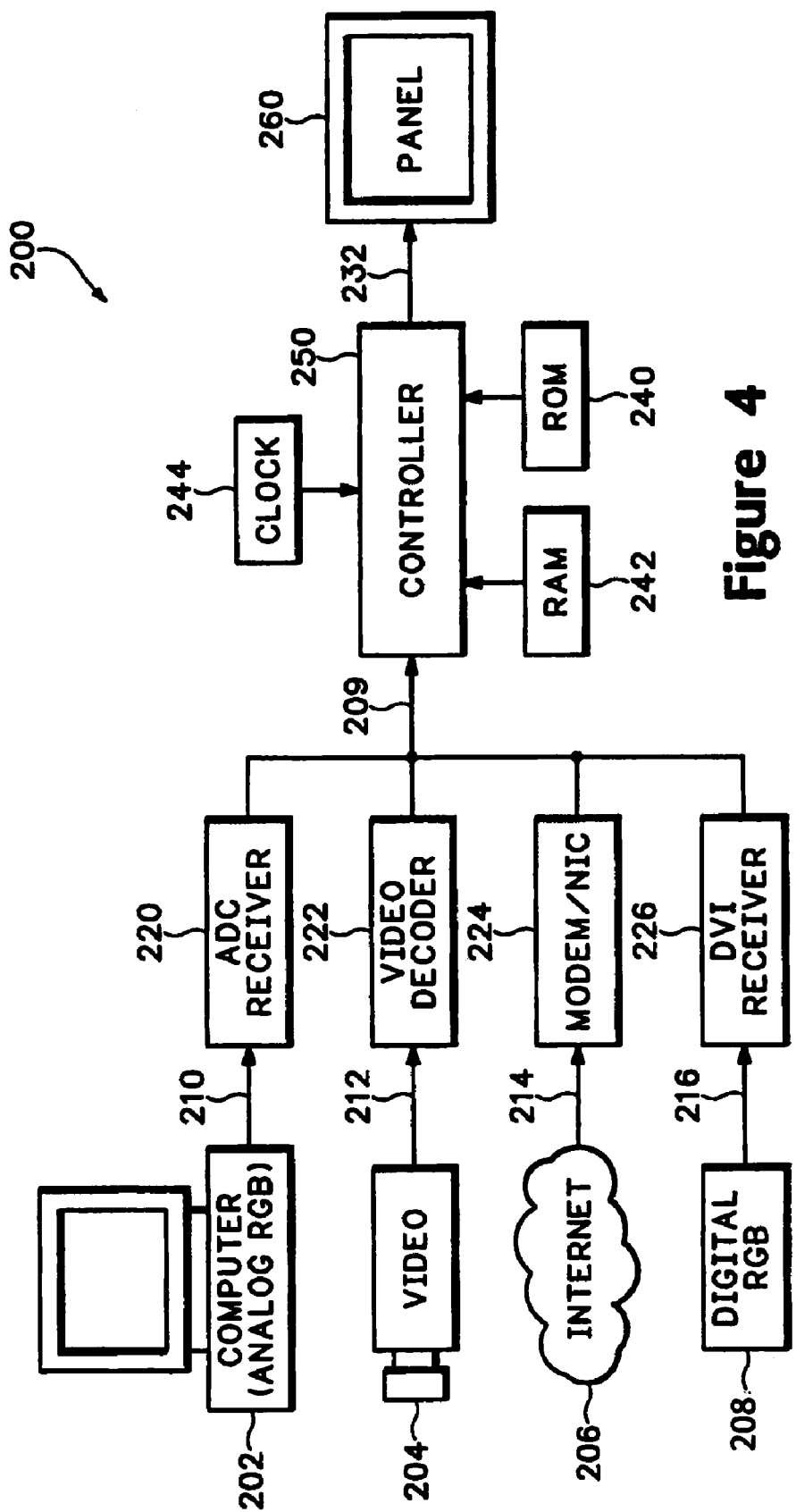
FIG. 4 is a block diagram of the inventive projection system.

FIG. 4 is a block diagram of the projection system 200 shown in FIG. 2. Referring to FIGS. 2 and 4, the system 200 includes a receiver 220 for receiving an analog image data signal 210, e.g., an RGB signal, from a source 202. The receiver 220 might be an analog-to-digital converter (ADC) or the like. The source 202 might be a personal computer or the like. The receiver 220 converts the analog image data signal 210 into digital image data 209 and provides it to a panel controller 250.

Likewise, a video receiver or decoder 222 decodes an analog video signal 212 from a video source 204. The video source 204 might be a video camcorder and the like. The decoder 222 converts the analog video signal 212 into digital image data 209 and provides it to the panel controller 250.

A modem or network interface card (NIC) 224 receives digital data 214 from a global computer network 206 such as the Internet®. The modem 224 provides digital image data 209 to the panel controller 250.

A Digital Visual Interface (DVI) receiver 226 receives digital RGB signals 216 from a digital RGB source 208. The DVI receiver 226 provides digital image data 209 to the panel controller 250.

A person of reasonable skill in the art should recognize other sources and other converters come within the scope of the present invention.

A person of reasonable skill in the art should recognize that some of the blocks shown in FIG. 4 might be incorporated into the projector 203 while others might be incorporated into the computer 207. It should be apparent to one of reasonable skill in the art that the computer 207 in FIG. 2 exemplifies the analog RGB source 202, video source 204, global computer network 206, and/or digital RGB source 208. And it should be apparent to one of reasonable skill in the art that the ADC receiver 220, video decoder 222, modem/NIC card 224, and DVI receiver 226 as well as a panel controller 250, clock 244, RAM 242, ROM 240, and panel 260 might be incorporated into the projector 203.

The panel controller 250 generates (predistorted) image data 232 by manipulating the (undistorted) image data 209. The panel controller 250 provides the image data 232 to a flat panel device 260. The panel 260 is any device capable of projecting the digital image data 232. In an embodiment, the panel 260 includes a pixelated display that has a fixed pixel structure together with the optics and electronics necessary to project the digital image data 232 on a surface 114 (FIG. 1). Examples of pixelated displays are active and passive LCD displays, plasma displays (PDP), field emissive displays (FED), electro-luminescent (EL) displays, micro-mirror technology displays, low temperature polysilicon (LTPS) displays, and the like for use in television, monitor, projector, hand held, and other like applications. The optics and electronics necessary to project the image data 232 are well known to those of reasonable skill in the art.

In an embodiment, the panel controller 250 might scale the digital image data 209 for proper projection by the panel 260 using a variety of techniques including pixel replication, spatial and temporal interpolation, digital signal filtering and processing, and the like. In another embodiment, the controller 250 might additionally change the resolution of the digital image data 209, changing the frame rate and/or pixel rate encoded in the digital image data 209. Scaling, resolution, frame, and/or pixel rate conversion, and/or color manipulation are not central to this invention and are not discussed in further detail. A person of reasonable skill in the art should recognize that the controller 250 manipulates the (undistorted) image data 209 and provides (predistorted) image data 232 to a panel 260 that is capable of properly projecting a high quality image regardless of display type.

Read-only (ROM) and random access (RAM) memories 240 and 242, respectively, are coupled to the display system controller 250) and store bitmaps, FIR filter coefficients, and the like. A person of reasonable skill in the art should recognize that the ROM and RAM memories 240 and 242, respectively, might be of any type or size depending on the application, cost, and other system constraints. A person of reasonable skill in the art should recognize that the ROM and RAM memories 240 and 242, respectively, might not be included in the system 200. A person of reasonable skill in the art should recognize that the ROM and RAM memories 240 and 242, respectively, might be external or internal to the controller 250. Clock 244 controls timing associated with various operations of the controller 250. A person of reasonable skill in the art should recognize that the projector 203 might house all or part of the controller 250, clock 244, RAM 242, ROM 240, panel 260, as well as the optics and electronics necessary to project the (predistorted) image data 232.

FIG. 5 is a block diagram of an embodiment of the panel controller 250 shown in FIG. 4. Referring to FIGS. 2-5, the panel controller 250 includes a keystone controller 280 coupled to an interface 252 that interacts with a user 258 in a variety of manners. The interface 252 shows the user 258 instructions on e.g., the projection surface 217 (FIG. 2), and accepts input 251 from the user 258 using a variety of input means. The interface 252 might support such features as infrared input devices, keypads, mice, pointers, other pointing devices (e.g., trackball), graphically presented commands (e.g., icons), desktops, windows, and/or menus. The interface 252 might be a graphical user interface (GUI), e.g., an on screen display, that takes advantage of the controller 250's graphics capabilities to ease the interaction between it and the user 258.

The system 200 is capable of manual, semiautomatic, and automatic keystone correction. Where the user 258 seeks to manually keystone correct the image 218, it might position the projector 203 so as to minimize distortion on the surface 217. The user 258 might position the projector 203 by raising or lowering elevators 120 (FIG. 1) or by moving the projector vertically and horizontally on the support 201.

Where the user 258 seeks to semi automatically keystone correct the image 218, the user 258 might indicate to the interface 252 properties of the projected image 218 and/or the projection surface 217. In an embodiment, the interface 252 generates an electronic icon or other GUI that the user 258 manipulates to align a center of the projected image 218 with a center of the projection surface 217. The user 258 actuates the GUI to inform the interface 252 of the centers' alignment (and its position). It should be apparent to a person of skill in the art that the user 258 can align the center of the projected image 218 with surfaces or areas other than the projection surface 217.

In another embodiment, the user 258 might use the interface 252's GUI to select a plurality of corners of the desired (undistorted) image within the projected image 218. The plurality of corners might be, e.g., two, three, or four corners. In an embodiment, the user's selected corners lie within the projected image 218. The interface 252 transmits the user's input 251 to the keystone controller 280 as data 253.

The keystone controller 280, in turn, predistorts the image data 209 responsive to the user's input 253 (center and/or corner) as further explained in co pending patent application titled Semiautomatic Keystone Correction System And Method, filed Nov. 26, 2003, to Brian Teng and Mike Callahan.

Where the user 258 seeks to automatically keystone correct the image 218, the interface 252 projects a pattern 290 (FIG. 12) on the projection surface 217. In an embodiment, the interface 252 might project the pattern 290 at the request of the user 258.

Figure 12:
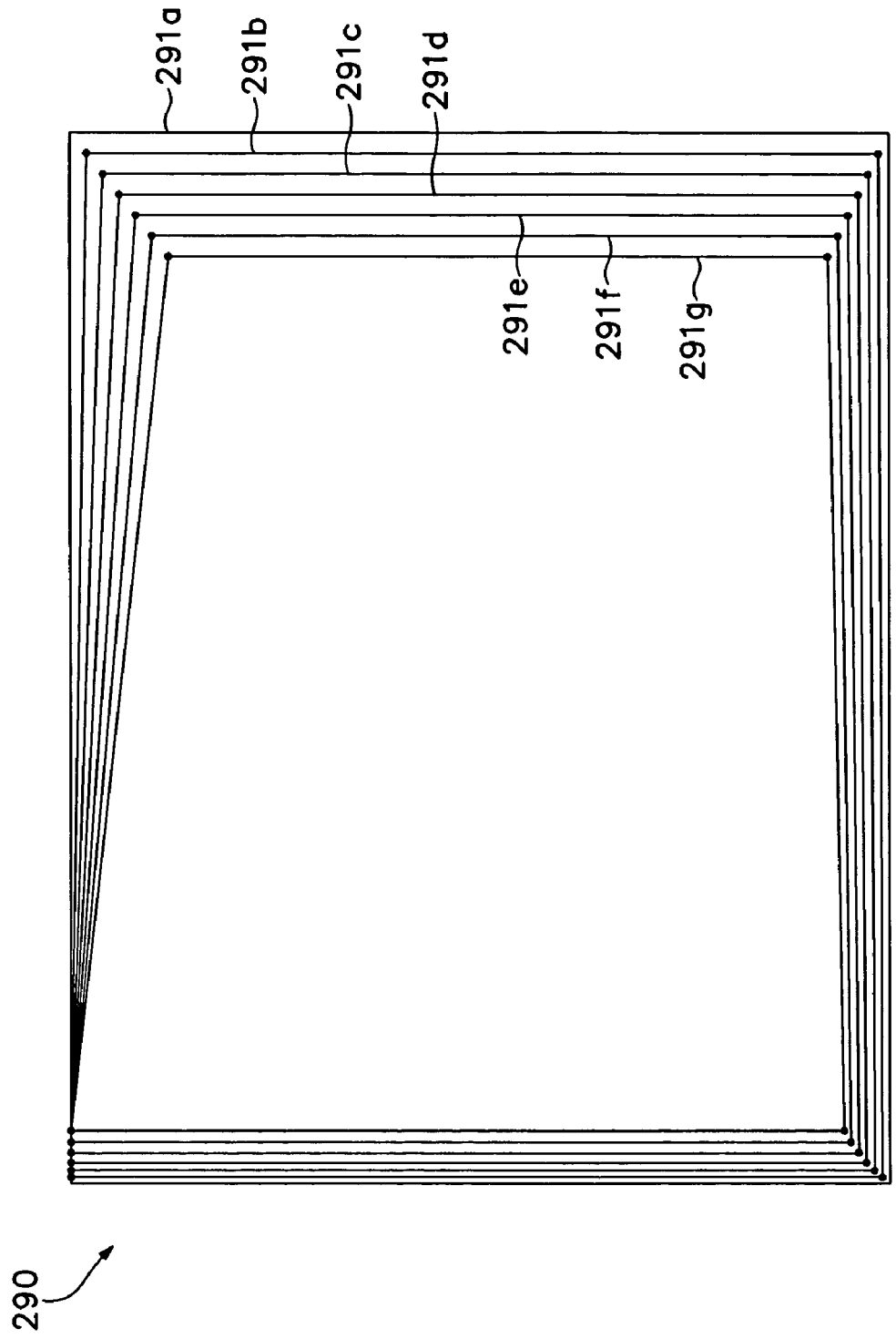
FIG. 12 is a graphical representation of the operation of the keystone controller shown in FIGS. 5 and 6.

Referring to FIG. 12, the pattern 290 includes a plurality of polygons 291a-291g, each having a predetermined (pre-projection) shape. The (pre-projection) shape of each polygon 291a-291g prior to its projection corresponds to a particular projector 203's rotation angle, including vertical tilt and horizontal rotation βv and βh, respectively. For example, polygon 291a might correspond to a 0-degree horizontal rotation βh while polygon 291b might correspond to a 3-degree horizontal rotation βh, polygon 291c might correspond to a 6-degree horizontal rotation βh, polygon 291d might correspond to a 9-degree horizontal rotation βh, and so on. The relationship between the polygons 291a-291g and the rotation angle βh might be stored in a table (not shown) on e.g., memory 242 or 240. A person of reasonable skill in the art should understand that the pattern 290 might vary depending on a variety of circumstances including the particular application.

Upon projection, each polygon 291a-291g responds differently to keystoning such that one of the polygons 291a-291g will more closely approximate a predetermined (post-projection) shape, e.g., polygon 291a. Put differently, the polygon 291a-291g becomes a predetermined (post-projection) shape for the rotation angle it matches when projected on the surface 217. The (post-projection) shape of the polygons 291a-291g varies with each implementation but might be e.g., a rectangle or other such geometric shape.

Referring to FIGS. 5 and 12, the user 258 selects the polygon 291a-291g that most closely approximates the predetermined (post-projection) shape when projected on the surface 217. In an embodiment, the user 258 selects the polygon 291a-291g that most closely approximates a rectangle. The user 258 might select the polygon 291a-291g by, for example, clicking on it using a mouse (not shown) or other input means supported by the interface 252.

The controller 280, in turn, automatically distorts the image data 209 to generate the predistorted image data 232. The controller 280 automatically distorts the image data 209 responsive to the user 258's selection of the polygon 291a-291g that most closely matches the predetermined (post-projection) shape. Since each polygon 291a-291g is associated with a corresponding vertical tilt βv and horizontal rotation βh, the user 258's selection identifies these angles to the interface 252 that, in turn, transmits them to the controller 280 as position data 253.

Figure 13:
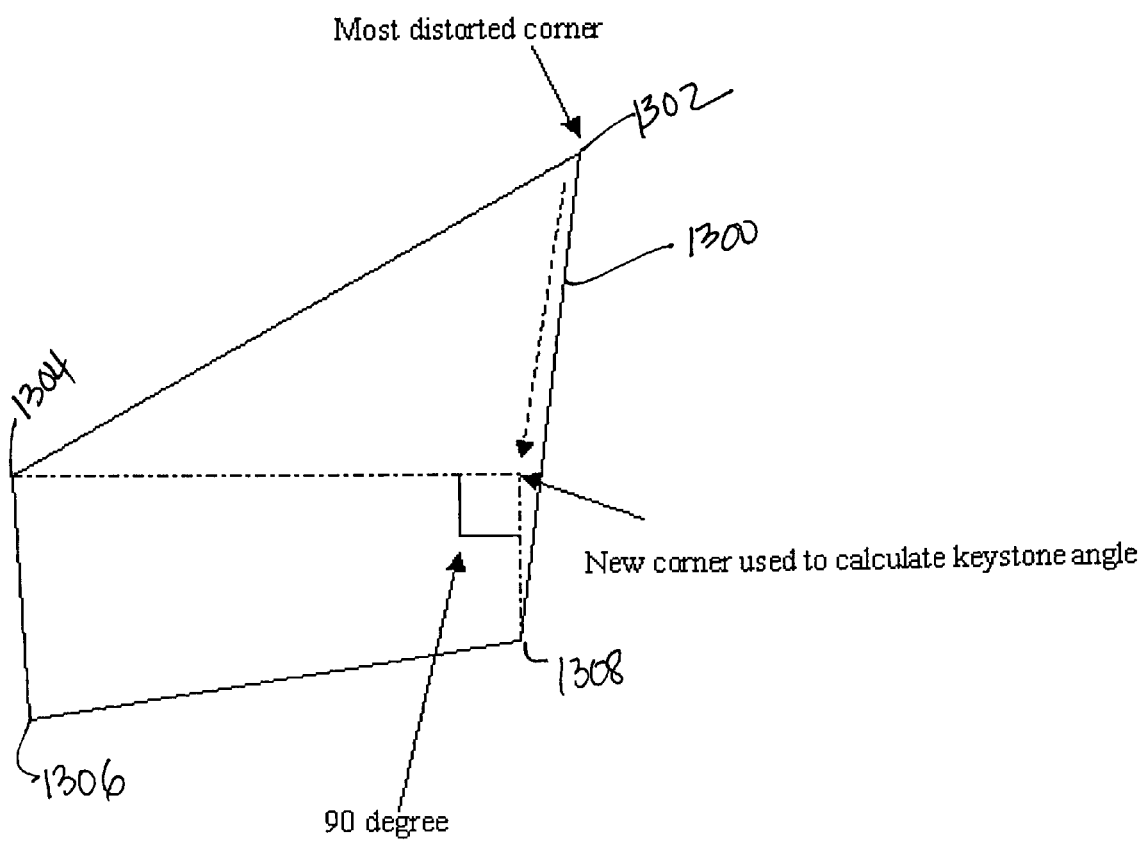
FIG. 13 is a graphical representation of the operation of the keystone controller shown in FIGS. 5 and 6.

Likewise and referring to FIGS. 5 and 13, the projector 203 and/or interface 252 projects an image 1300 including corners 1302, 1304, 1306, and 1308. The user 258 selects the corner 1302 exhibiting maximal distortion using the interface 252. The user 258 may select the corner 1302 using a mouse or other such interface device. In an embodiment, the user 258 selects the corner 1302 having an angle less than 90 degrees. The user 258 moves the corner 1302 using the GUI 252 until the corner 1302 has a substantially 90 degree angle. For example, the user 258 moves the corner 1302 to a new position 1310 with a substantially 90 degree angle. Like the pattern 290, the corner 1310 and its associated projected polygon corresponds to a particular projector 203's rotation angle, including vertical tilt and horizontal rotation βv and βh, respectively. A person of reasonable skill in the art should recognize other methods of interaction between the user 258 and the image 1300 that come within the scope of this invention. A person of reasonable skill in the art should recognize other means of projecting an image 1300 on the projection surface 217.

The controller 280, in turn, automatically distorts the image data 209 to generate the predistorted image data 232. The controller 280 automatically distorts the image data 209 responsive to the user 258's selection of the corner 1310. Since the polygon 1300 (with its new corner 1310) is associated with a corresponding vertical tilt βv and horizontal rotation βh, the user 258's selection identifies these angles to the interface 252 that, in turn, transmits them to the controller 280 as position data 253.

FIG. 11 illustrates a geometric simplification of the vertical tilt βv and rotation βr where the projector 102 moves from position 1 to position 2.

tan βh=sin βv tan βr

The horizontal angle βh cannot be found if the rotation βv is zero. When this is the case, the user 258 might use semiautomatic or manual means of keystone correction as we explained above.

Figure 6:
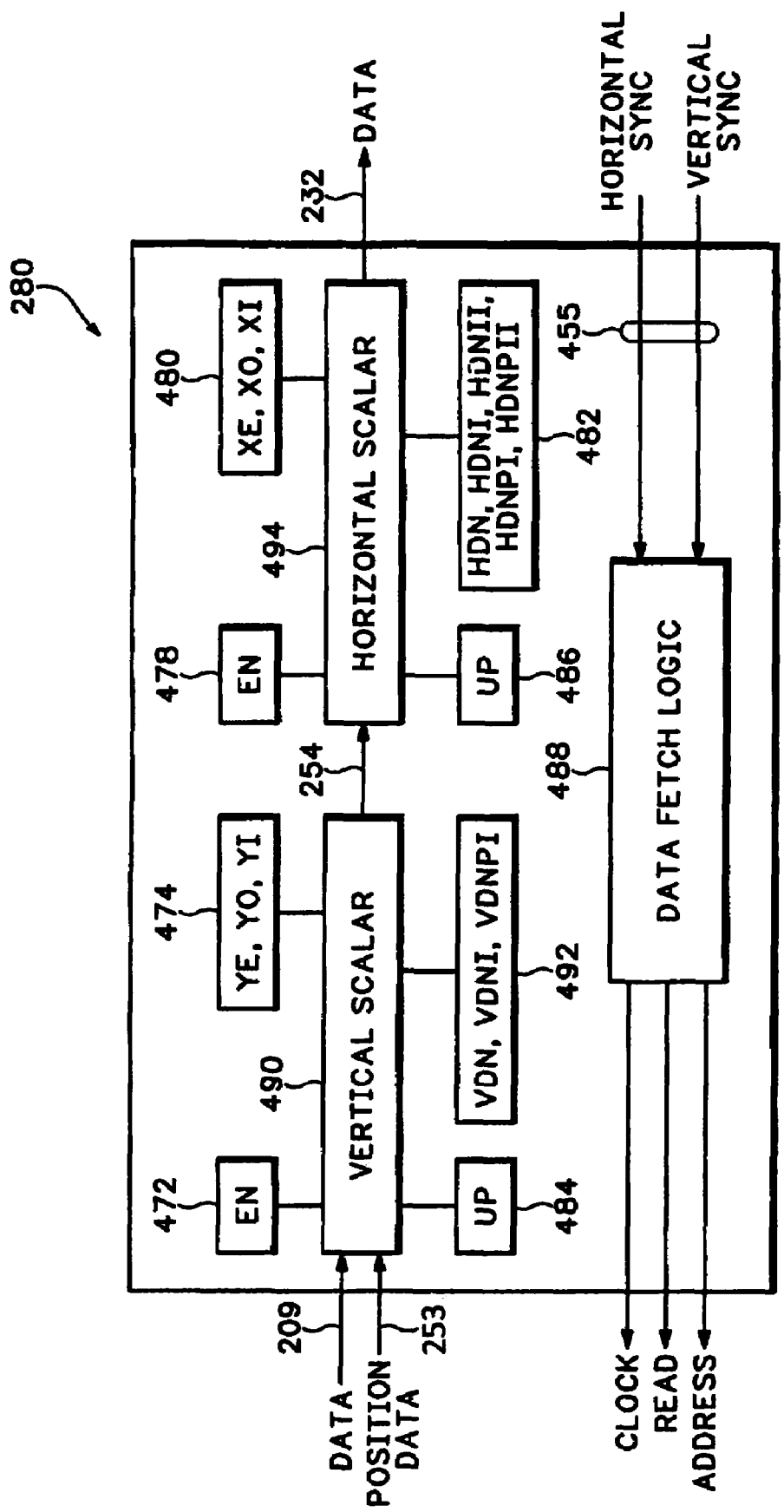
FIG. 6 is a block diagram of an inventive keystone controller.

FIG. 6 is a block diagram of the keystone controller 280. Referring to FIGS. 2-6, a keystone controller 280 receives digital image data 209 from a source 207. The controller 280 additionally receives data 253 from the user 258 triggering manual, semiautomatic, or automatic keystone correction as we explained above.

The keystone controller 280 includes a vertical scalar 490 for vertically scaling the digital image data 209. And the keystone controller 280 includes a horizontal scalar 494 for horizontally scaling the image data 254 received from the vertical scalar 490.

A vertical enable register 472 enables the vertical scalar 490. The vertical scalar 490 generates the vertically scaled data 254 responsive to vertical offset registers 474 including the registers YE (column even), YO (column odd), and YI (column increment ($1^{st}$ order term)) where the image data 209 is an interlaced signal. And the vertical scalar 490 generates the vertically scaled data 254 responsive to the vertical registers 492 including registers VDN (line position), VDNI (increment per line ($1^{st}$ order term)), and VDNPI (increment per column). The vertical scalar 490 moves up one row or line responsive to the UP register 484. The microprocessor 488 scales the image data 209 responsive to the registers 472, 474, 484, and 492 and to the horizontal and vertical synchronization signals 455.

Likewise, a horizontal enable register 478 enables the horizontal scalar 494. The horizontal scalar 494 generates the horizontally and vertically scaled predistorted data 232 responsive to horizontal offset registers 480 including the registers XE (row even), XO (row odd), and XI (row increment ($1^{st}$ order term)) where the image data 209 is an interlaced signal. And the horizontal scalar 494 generates the horizontally and vertically scaled data 232 responsive to the horizontal registers 482 including registers HDN (row position), HDNI (increment per line ($1^{st}$ order term)), HDNII (increment per line ($2^{nd}$ order term)), and HDNPI (increment per column). The horizontal scalar 494 moves one column or pixel responsive to the UP register 486. The microprocessor 488 scales the image data 209 responsive to the registers 478, 480, 482, and 486 and to the horizontal and vertical synchronization signals 455.

Before turning to the operation of the keystone controller 280, we examine some keystone basics. FIGS. 7A-C are diagrams of a coordinate system used to describe keystone distortion. Referring to FIGS. 7A-C, a projected image falls on a plane 600 defined by coordinates (x, y, 0). PP defines a projection point at coordinates (0,0,d), where d is a distance from the image plane 600 to the projection point PP. NPL defines a normal projection line to the plane 600. FIGS. 7B and 7C are side and top views of the coordinate system shown in FIG. 7A where db is the difference between a horizontal projection axis and the normal projection line NPL. $\Phi_{VT}$ and $\Phi_{VB}$ are the vertical top and bottom angles, respectively. $\Phi_{VL}$ and $\Phi_{VR}$ are the left and right angles, respectively. Hn0 is the vertical height and Wn0 is the horizontal width of the image in a nominal position.

FIGS. 8 and 9 are graphical representations of the operation of the keystone controller 280. Referring to FIG. 8, the undistorted image data 209 is represented by ($x_n$, $y_n$). The predistorted image data 232 is represented by ($x_k$, $y_k$). Formula 1 gives the function $f_1$.

$(x_k,y_k)=f_1(x_n,y_n,\beta_h, \text{and } \beta_v)$   Formula 1 where βv is the vertical tilt or angle and $\beta_h$ is the horizontal position or angle of the desired keystone corrected (or predistorted) image 232.

The keystone controller 280 calculates $f_1$ as follows.

$$xp[x,y] = \frac{\text{Cos}[\beta h] \times x - \text{Sin}[\beta h] \times \text{Sin}[\beta v] \times y}{1 + \frac{\text{Sin}[\beta h] \times x + \text{Cos}[\beta h] \times \text{Sin}[\beta v] \times y}{d}}$$

$$yp[x,y] = \frac{\text{Cos}[\beta v] \times y - \left(db - \frac{Hn0}{2}\right)}{1 + \frac{\text{Sin}[\beta h] \times x + \text{Cos}[\beta h] \times \text{Sin}[\beta v] \times y}{d}} + \left(db - \frac{Hn0}{2}\right)$$

Formula $f_1$ is a complicated formula containing trigonometric functions that are computation intensive. The present invention constructs simple polynomials $f_2$ and $f_3$ that approximate $f_1$ and are applied to the vertical and horizontal scalars 490 and 494, respectively. That is, the combination of $f_2$ and $f_3$ approximates $f_1$. Referring to FIGS. 2-9, the image data 209 is vertically scaled by vertical scalar 490 responsive to an $f_2$ function to produce the vertically scaled data 254. Formula 2 gives the function $f_2$.

$$f_2(x_n, y_n, vdn, vdni, vdnpi, yo, yi) \quad \text{Formula 2}$$

The vertical scalar 490 operates responsive to the register VDN and the x and y position (line and column number) of the projected image 218.

The vertical scalar 490 uses a vertical scale factor of VDN(x,y)=VDN+f(x,y).

The vertical offset registers YE and YO control the top edge of the image. The top of the image is a function of YE/YO and X. The top of the image is also a weak function of the registers VDN, VDNI, and VDNPI.

The vertical offset register 486 is related to YE (or YO)+f(x).

The vertical scalar 490 operates under the control of the microprocessor 488.

The vertically scaled data 254 is horizontally scaled by the horizontal scalar 494 responsive to an $f_3$ function to produce the horizontally scaled data 232. Formula 3 gives the function $f_3$.

$$f_3(x_n, y_k, hdn, hdni, hdnii, hdnpi, hdnpii, xo, xi, xii) \quad \text{Formula 3}$$

The horizontal scalar 494 operates responsive to the register HDN and the x and y position (line and column numbers) of the projected image 218.

The horizontal scalar 494 uses a horizontal scale factor of HDN(x,y)=HDN+f(x,y).

The horizontal offset register 480 directly controls the left edge of the image.

The horizontal scalar 494 operates under the control of the microprocessor 488.

Functions $f_2$ and $f_3$ are as follows.

$$f2 = eqnV = \sum_{j=0}^{b} \left( \frac{VDN}{2^{16}} + a \times \frac{VDNPI}{2^{16}} + j \times \frac{VDNI}{2^{16}} \right) + \left( YO + a \times \frac{YI}{2^{16}} \right) /$$

$$f3 = eqnH =$$

$$\sum_{i=0}^{a} \left( \frac{HDN}{2^{16}} + \frac{HDNPII}{2 \times 2^{26}} \times i^2 + \left( \frac{HDNPI}{2^{16}} + \frac{HDNPII}{2 \times 2^{26}} \right) \times i + \frac{HDNII}{2 \times 2^{26}} \times b^2 + \left( \frac{HDNI}{2^{16}} + \frac{HDNII}{2 \times 2^{26}} \right) \times b \right) + \left( XO + b \times \frac{XI}{2^{16}} + b^2 \times \frac{XI}{2^{19}} \right).$$

The keystone controller 280 calculates the required register values for predistorting or keystone correcting the image 218. In an embodiment, the keystone controller 280 accesses a precalculated look up table comprising all of the register values for several rotation stages. Doing so speeds up execution time by allowing register value precalculation instead of having to calculate the register values on the fly.

Figure 10:
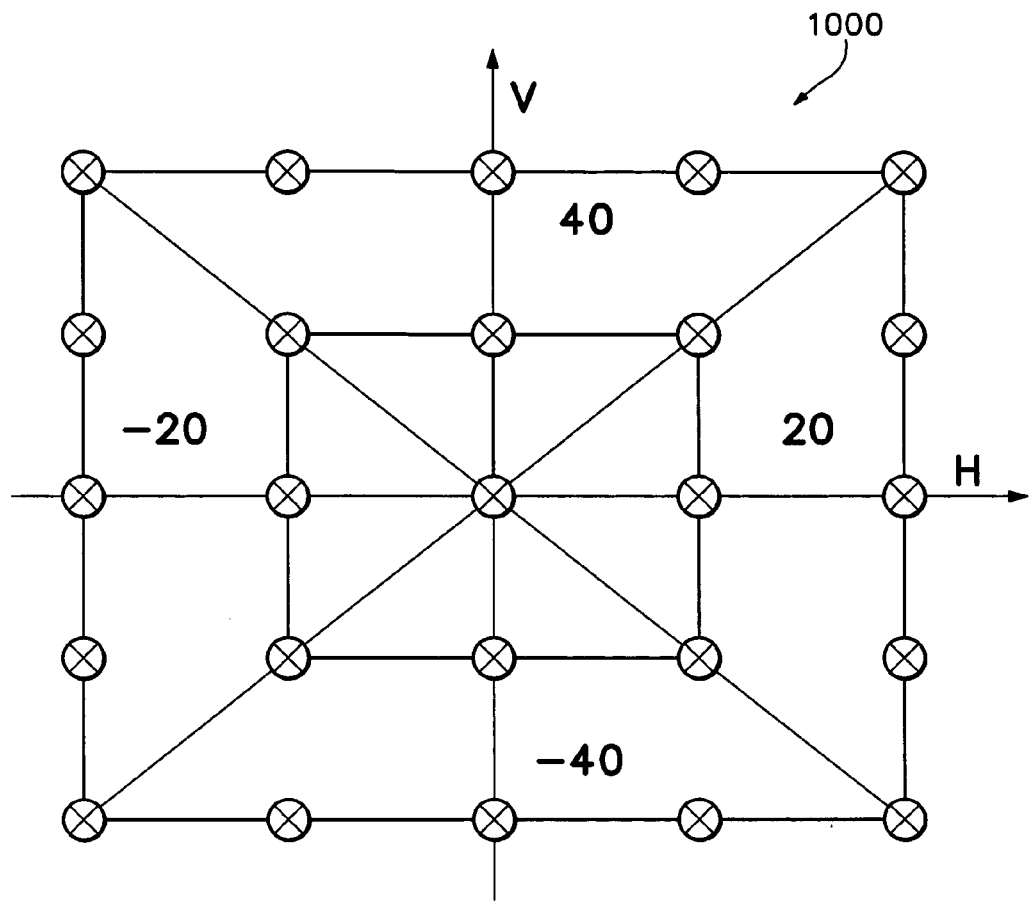
FIG. 10 is diagram of an inventive lookup table.

FIG. 10 is an embodiment of a lookup table 1000. The table includes a predetermined number of combinations, e.g., 0, +/−10, and +/−20 on the x-axis and 0, +/−20, and +/−40 on the y-axis.

If a rotation angle combination falls between two points, the controller 280 interpolates between the values given by the table. The following is an exemplary bilinear interpolation formula.

$$wx = \frac{\beta h - \beta h[p]}{\beta h[p+1] - \beta h[p]}$$

$$wy = \frac{\beta v - \beta v[p]}{\beta v[q+1] - \beta v[q]}$$

estimate =

$(1 - wx) \times (1 - wy) \times \text{Table}[p, q] + wx \times (1 - wy) \times \text{Table}[p+1, q] +$ $(1 - wx) \times wy \times \text{Table}[p, q+1] + wx \times wy \times \text{Table}[p+1, q+1]$ Where the table provides the coordinates (p, q) of the nearest point and the keystone controller 280 interpolates the nearest point to the vertical and horizontal rotation angles $\beta v$ and $\beta h$, respectively, of the interpolated point.

A person of reasonable skill in the art should identify several different interpolation methodologies as coming within the scope of the present invention. A person of reasonable skill in the art should realize the table could be implemented in a variety of manners using a variety of hardware, including implementing it as part of semiconductor memory 240 and/or 242 or memory embedded within the panel controller 250.

The microprocessor 488 calculates the vertical scalar 490's registers as follows.

With $f_1$ and a set of $(x_n, y_n)$, calculate $(x_k, y_k)$.

Given the $(x_n, y_n)$ input, the $(x_n, y_k)$ output, and $f_2$, the keystone controller 280 calculates vdn, vdni, vdnpi, yo, and yi.

The microprocessor 488 calculates the horizontal scalar 494's registers as follows.

Given the $(x_k, y_k)$ output, the $(x_n, y_k)$ input, and $f_3$, the keystone controller 280 calculates hdn, hdni, hdnii, xo, xi, and xii.

Having illustrated and described the principles of our invention(s), it should be readily apparent to those skilled in the art that the invention(s) can be modified in arrangement and detail without departing from such principles. We claim all modifications coming within the spirit and scope of the accompanying claims.

I claim:

1. A keystone correction system, comprising:
an interface to select a maximally distorted corner on a projected image; and
a keystone controller to distort image data responsive to moving the maximally distorted corner and responsive to an identification of a tilt and a rotation of the system, the keystone controller comprising:
a plurality of vertical offset registers comprising a column even register (YE), a column odd register (YO), and a column increment (1st order term) register (YI);
a plurality of vertical registers comprising a line position register (VDN), an increment per line (1st order term) register (VDNI), and an increment per column register (VDNPI);
a vertical enable register;
a vertical scalar to vertically scale image data responsive to at least the vertical offset registers, the vertical registers, and the vertical enable register;
a plurality of horizontal offset registers comprising a row even register (XE), a row odd register (XO), and a row increment (1st order term) register (XI);
a plurality of horizontal registers comprising a row position register (HDN), an increment per line (1st order term) register (HDNI), an increment per line (2nd order term) register (HDNII), an increment per column ($1^{st}$ order term) register (HDNPI), and an increment per column ($2^{nd}$ order term) register (HDNPII);

a horizontal enable register; and a horizontal scalar to horizontally scale the vertically scaled image data responsive to at least the horizontal offset registers, the horizontal registers, and the horizontal enable register.

2. The keystone correction system of claim 1 where the maximally distorted corner has a less than 90 degree angle.

3. The keystone correction system of claim 1 where the interface interacts with a user to move the maximally distorted corner from a first to a second position.

4. The keystone correction system of claim 3 where the maximally distorted corner in the second position has a substantially 90 degree angle.

5. The keystone correction system of claim 4 where the keystone controller distorts the image data responsive to the second position.

6. The keystone correction system of claim 1, where the tilt and the rotation of the keystone correction system are identified using at least an accelerometer included in the system.

7. The keystone correction system of claim 1, where the tilt and the rotation of the keystone correction system is input by a user.

8. The keystone correction system of claim 1, where the keystone controller calculates a horizontal angle responsive to the identification of the tilt and the rotation.

9. The keystone correction system of claim 1 comprising a first UP register, where the vertical scalar vertically scales the image data responsive to the first UP register.

10. The keystone correction system of claim 9 comprising a second UP register, where the horizontal scalar horizontally scales the vertically scaled image data responsive to the second UP register.

11. A method for keystone correction, comprising:

projecting an image on a projection surface;

selecting a distorted corner of the projected image; and a keystone controller predistorting image data responsive to the selected distorted corner, wherein the predistorting comprises:

a vertical scalar vertically scaling the image data responsive to at least a set of vertical offset registers and a set of vertical registers, wherein the set of vertical offset registers comprises a column even register (YE), a column odd register (YO), and a column increment ($1^{st}$ order term) register (YI), and wherein the set of vertical registers comprises a line position register (VDN), an increment per line ($1^{st}$ order term) register (VDNI), and an increment per column register (VDNPI); and a horizontal scalar horizontally scaling the vertically scaled image data responsive to at least a set of horizontal offset registers and a set of horizontal registers, wherein the set of horizontal offset registers comprises a row even register (XE), a row odd register (XO), and a row increment ($1^{st}$ order term) register (XI), and wherein the set of horizontal registers comprises a row position register (HDN), an increment per line ($1^{st}$ order term) register (HDNI), an increment per line ($2^{nd}$ order term) register (HDNII), an increment per column ($1^{st}$ order term) register (HDNPI), and an increment per column ($2^{nd}$ order term) register (HDNPII).

12. The method of claim 11 where selecting the distorted corner includes selecting a maximally distorted corner.

13. The method of claim 12 where selecting the maximally distorted corner includes selecting a corner having a less than 90 degree angle.

14. The method of claim 11 comprising moving the distorted corner from a first position to a second position.

15. The method of claim 14, where moving the distorted corner forms an associated projected polygon, the polygon corresponding to a vertical and a horizontal rotation angle of a projector.

16. The method of claim 15, where the vertical and horizontal rotation angles are transmitted to a keystone controller as a set of position data.

17. The method of claim 11 comprising moving a distorted corner from a first position where the corner has less than a 90 degree angle to a second position where the corner has a substantially 90 degree angle.

18. The method of claim 17 where distorting the image data includes distorting the image data responsive to the second position.

19. The method of claim 11 comprising the vertical scalar vertically scaling the image data responsive to a vertical enable register.

20. The method of claim 19 comprising the horizontal scalar horizontally scaling the vertically scaled image data responsive to a horizontal enable register.

21. The method of claim 11 comprising the vertical scalar vertically scaling the image data responsive to a first UP register.

22. The method of claim 21 comprising the horizontal scalar horizontally scaling the vertically scaled image data responsive to a second UP register.

23. The method of claim 11 where vertically scaling the image data comprises using the following first polynomial function $f_2$:

$$f2 = eqnV = \sum_{j=0}^{b} \left( \frac{VDN}{2^{16}} + a \times \frac{VDNPI}{2^{16}} + j \times \frac{VDNI}{2^{16}} \right) + \left( YO + a \times \frac{YI}{2^{16}} \right).$$

24. The method of claim 23 where horizontally scaling the vertically scaled image data comprises using the following second polynomial function $f_3$:

$$f3 = eqnH = \sum_{i=0}^{e} \left( \frac{HDN}{2^{16}} + \frac{HDNPII}{2 \times 2^{26}} \times i^2 + \left( \frac{HDNPI}{2^{16}} + \frac{HDNPII}{2 \times 2^{26}} \right) \times i + \frac{HDNII}{2 \times 2^{26}} \times b^2 + \left( \frac{HDNI}{2^{16}} + \frac{HDNII}{2 \times 2^{26}} \right) \times b \right) + \left( XO + b \times \frac{XI}{2^{16}} + b^2 \times \frac{XII}{2^{19}} \right).$$

25. A keystone apparatus, comprising: means for projecting an image on a projection surface; means for selecting a maximally distorted corner on the image; means for moving the maximally distorted corner from a first to a second position; means for identifying a position of the keystone apparatus in two dimensions; means for generating vertically scaled data by vertically scaling image data responsive to at least a set of vertical offset registers and a set of vertical registers, wherein the set of vertical offset registers comprises a column odd register (YO) and a column increment ($1^{st}$ order term) register (YI), and wherein the set of vertical registers comprises a line position register (VDN), an increment per line ($1^{st}$ order term) register (VDNI), and an increment per column register (VDNPI), wherein the means for generating vertically scaled data comprises a first polynomial function $f_2$, wherein the image data corresponds to the image, the first polynomial function $f_2$ comprising the following function:

$$f2 = eqnV = \sum_{j=0}^{b} \left(\frac{VDN}{2^{16}} + a \times \frac{VDNPI}{2^{16}} + j \times \frac{VDNI}{2^{16}}\right) + \left(YO + a \times \frac{YI}{2^{16}}\right);$$

means for generating horizontally scaled data by horizontally scaling the generated vertically scaled data responsive to at least a set of horizontal offset registers and a set of horizontal registers, wherein the set of horizontal offset registers comprises a row odd register (XO), a row increment ($1^{st}$ order term) register (XI), and a row increment ($2^{nd}$ order term) register (XII), and wherein the set of horizontal registers comprises a row position register (HDN), an increment per line ($1^{st}$ order term) register (HDNI), an increment per line ($2^{nd}$ order term) register (HDNII), an increment per column ($1^{st}$ order term) register (HDNPI), and an increment per column ($2^{nd}$ order term) register (HDNPII), wherein the means for generating horizontally scaled data comprises a second polynomial function $f_3$ comprising the following function:

$$f3 = eqnH = \sum_{i=0}^{e} \left(\frac{HDN}{2^{16}} + \frac{HDNPII}{2 \times 2^{26}} \times i^2 + \left(\frac{HDNPI}{2^{16}} + \frac{HDNPII}{2 \times 2^{26}}\right) \times i + \frac{HDNII}{2 \times 2^{26}} \times b^2 + \right.$$

$$\left.\left(\frac{HDNI}{2^{16}} + \frac{HDNII}{2 \times 2^{26}}\right) \times b\right) + \left(XO + b \times \frac{XI}{2^{16}} + b^2 \times \frac{XII}{2^{19}}\right);$$ and means for distorting the image data responsive to the moving, the identifying, and the generated horizontally scaled data.

26. The keystone apparatus of claim 25 where the maximally distorted corner includes a less than 90 degree angle.

27. The keystone apparatus of claim 25 where the maximally distorted corner in the first position has an angle less than 90 degrees; and where the maximally distorted corner in the second position has a substantially 90 degree angle.

28. The keystone apparatus of claim 27 where the image having the maximally distorted corner in the second position forms a polygon associated with a corresponding vertical rotation angle and a corresponding horizontal rotation angle.

29. The keystone apparatus of claim 25 where the means for distorting distorts the image data responsive to a vertical rotation angle and a horizontal rotation angle.

30. The keystone apparatus of claim 25, where the means for identifying the position includes means for identifying a tilt and a rotation of the keystone apparatus.

\* \* \* \* \*